United States Patent
Inoue

(10) Patent No.: US 10,029,311 B2
(45) Date of Patent: Jul. 24, 2018

(54) CUTTING INSERT, CUTTING TOOL, AND METHOD OF MANUFACTURING MACHINED PRODUCT USING THEM

(71) Applicant: KYOCERA Corporation, Kyoto-shi, Kyoto (JP)

(72) Inventor: Yoshihiro Inoue, Omihachiman (JP)

(73) Assignee: KYOCERA Corporation, Kyoto (JP)

( * ) Notice: Subject to any disclaimer, the term of this patent is extended or adjusted under 35 U.S.C. 154(b) by 1 day.

(21) Appl. No.: 15/033,398

(22) PCT Filed: Oct. 28, 2014

(86) PCT No.: PCT/JP2014/078587
§ 371 (c)(1),
(2) Date: Apr. 29, 2016

(87) PCT Pub. No.: WO2015/064559
PCT Pub. Date: May 7, 2015

(65) Prior Publication Data
US 2016/0271703 A1  Sep. 22, 2016

(30) Foreign Application Priority Data
Oct. 29, 2013 (JP) ................. 2013-223966

(51) Int. Cl.
*B23B 27/04* (2006.01)
*B26D 3/06* (2006.01)
*B23B 27/22* (2006.01)

(52) U.S. Cl.
CPC ...... *B23B 27/045* (2013.01); *B23B 2200/081* (2013.01); *B23B 2200/083* (2013.01);
(Continued)

(58) Field of Classification Search
CPC ........ B23B 2200/081; B23B 2200/328; B23B 2220/126; B23B 27/045; B23B 2200/083; B23B 2200/087; B23B 2200/321
See application file for complete search history.

(56) References Cited

U.S. PATENT DOCUMENTS 4,776,733 A * 10/1988 Pettersson ............. B23B 27/045
407/114
4,969,779 A * 11/1990 Barten ................. B23B 27/045
407/114
(Continued)

FOREIGN PATENT DOCUMENTS

EP    0416900 A2   3/1991
EP    0 775 544 A1  5/1997
(Continued)

OTHER PUBLICATIONS

International search report prepared by the Japanese Patent Office dated Nov. 25, 2014 in counterpart International Application PCT/JP2014/078587.

*Primary Examiner* — Sara Addisu
(74) *Attorney, Agent, or Firm* — Procopio Cory Hargreaves and Savitch LLP

(57) ABSTRACT

A cutting insert according to an embodiment of the present invention has a body section and a cutting section located closer to a front end side than the body section. The cutting section has an end cutting edge located along an intersection of an upper surface and a side surface, a recess located from the end cutting edge toward the body section, and a pair of protrusions opposed to each other with the recess interposed therebetween. The pair of protrusions has a first protrusion and a second protrusion located on the first protrusion. The first protrusion has a first inclined surface that is inclined upward and approaches another one of the pair of protrusions as going from the front end side toward the rear end
(Continued)

B-B Sectional View side. A periphery of the second protrusion which is close to the front end side has a convex curvilinear shape in a top view.

10 Claims, 13 Drawing Sheets

(52) U.S. Cl.
CPC ... *B23B 2200/087* (2013.01); *B23B 2200/321* (2013.01); *B23B 2200/328* (2013.01); *B23B 2220/126* (2013.01)

(56) References Cited

U.S. PATENT DOCUMENTS

| | | | | |
|---|---|---|---|---|
| 5,076,739 | A * | 12/1991 | Pano | B23B 27/045 407/114 |
| 5,137,396 | A * | 8/1992 | Durschinger | B23B 27/045 407/116 |
| 5,511,911 | A * | 4/1996 | Katbi | B23B 27/045 407/114 |
| 5,676,495 | A * | 10/1997 | Katbi | B23B 27/045 407/114 |
| 5,827,017 | A | 10/1998 | Tagstrom et al. | |
| RE37,595 | E * | 3/2002 | Lindstedt | B23B 27/045 407/110 |
| 6,742,971 | B2 * | 6/2004 | Tong | B23B 27/045 407/113 |
| 6,799,925 | B2 * | 10/2004 | Ejderklint | B23B 27/045 407/114 |
| 7,883,300 | B1 * | 2/2011 | Simpson, III | B23B 27/045 407/113 |
| 9,630,255 | B2 * | 4/2017 | Shimamoto | B23B 27/045 |
| 2003/0170081 | A1 * | 9/2003 | Andersson | B23B 27/045 407/116 |
| 2006/0269367 | A1 * | 11/2006 | Havrda | B23B 27/045 407/117 |
| 2008/0240874 | A1 * | 10/2008 | Nagaya | B23B 27/045 407/113 |
| 2008/0240875 | A1 * | 10/2008 | Nagaya | B23B 27/045 407/113 |
| 2013/0183109 | A1 | 7/2013 | Fujii | |
| 2013/0192431 | A1 | 8/2013 | Inoue | |

FOREIGN PATENT DOCUMENTS

| | | |
|---|---|---|
| EP | 2 578 340 A1 | 4/2013 |
| EP | 2 623 236 A1 | 8/2013 |
| JP | S62-053901 U | 4/1987 |
| JP | 9-174308 A | 7/1997 |
| JP | 10-505012 A | 5/1998 |
| JP | 2001-322010 A | 11/2001 |
| JP | 2008-272923 A | 11/2008 |
| WO | 98/08330 A1 | 3/1996 |
| WO | 2011/149091 A1 | 12/2011 |
| WO | 2012/043629 A1 | 4/2012 |

* cited by examiner

A-A Sectional View

B-B Sectional View

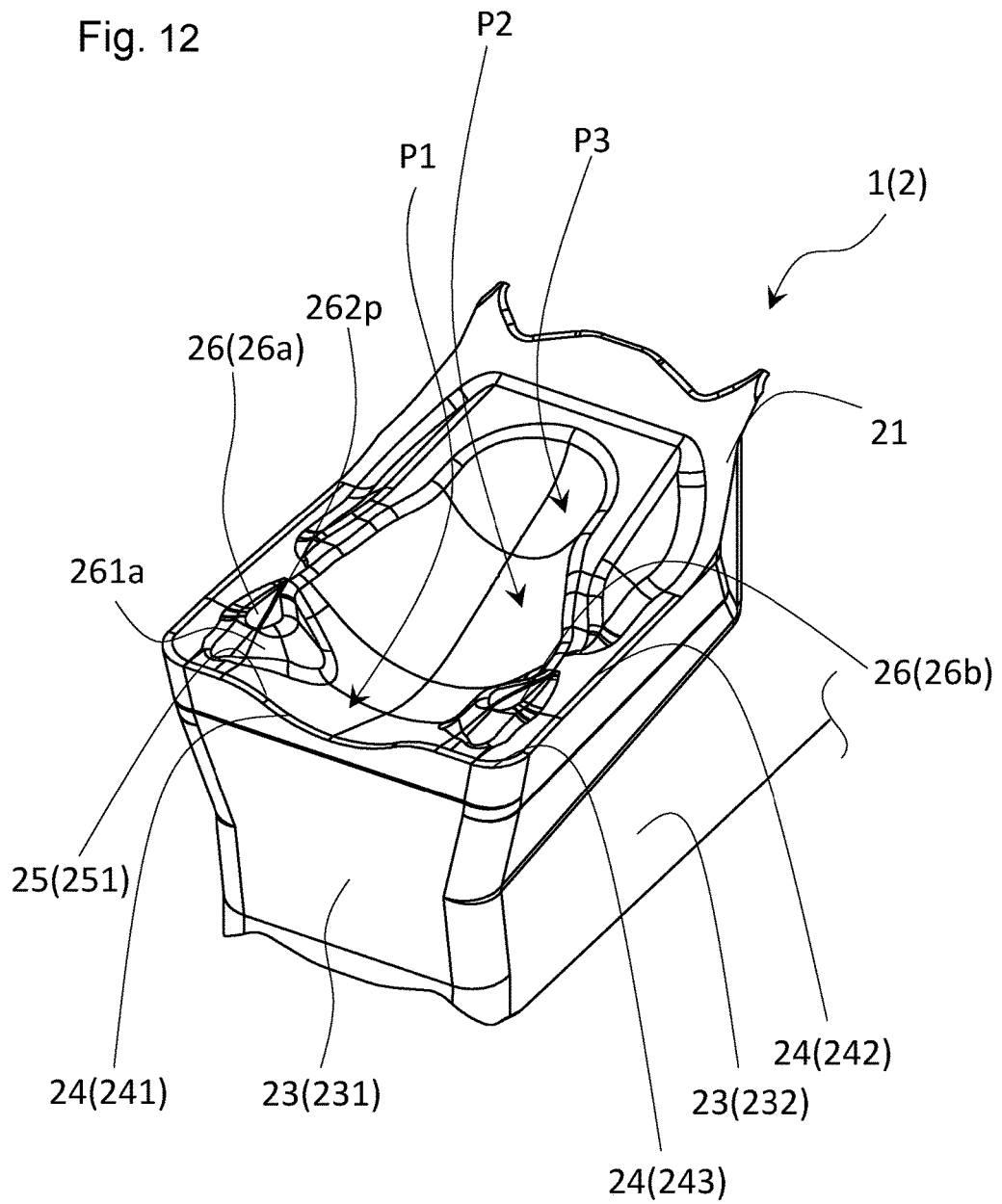

CUTTING INSERT, CUTTING TOOL, AND METHOD OF MANUFACTURING MACHINED PRODUCT USING THEM

CROSS REFERENCE TO RELATED APPLICATIONS

The present application is a National stage application which claims the benefit of PCT Application No. PCT/JP2014/078797 filed on 29 Oct. 2014, which claims the benefit of Japanese Application No. 2013-224775, filed on 29 Oct. 2013 and Japanese Application No. 2013-224568, filed on 29 Oct. 2013. The contents of each of the above applications are incorporated by reference herein in their entirety.

TECHNICAL FIELD

The present invention relates to a cutting insert, a cutting tool, and a method of manufacturing a machined product using them.

BACKGROUND ART

Conventionally, there has been a problem associated with control of a chip flow direction in various cutting processes (refer to Patent Documents 1 to 3). Particularly, as shown in FIG. 1, the control of chip flow direction is a significant problem with a cutting insert 1' for a grooving process of grooving an end surface of a columnar workpiece 100' by rotating the workpiece 100' in Y1' direction. Specifically, it is significant that a chip discharge direction is a direction parallel to a feed direction of a cutting tool (a direction indicated by a white arrow in FIG. 1) during the grooving process as shown in FIG. 1. If the chip discharge direction is a direction perpendicular to the feed direction of the cutting tool (a direction indicated by a black arrow in FIG. 1), chips may come into contact with the end surface of the workpiece without being discharged to the outside, thus causing chip clogging.

The cutting insert for the grooving process preferably brings chips into a continuous helical shape than finely cutting the chips. When the chips are finely cut and discharged, the chips may scatter somewhere on the end surface of the workpiece, thus increasing the possibility of chip clogging. However, if it is possible to discharge chips in a continuous shape, the chips are less likely to come into contact with the end surface of the workpiece, thereby reducing the possibility of chip clogging. Hence, a significant problem associated with the cutting insert for the grooving process is how to control chips so as to flow the chips in the direction parallel to the feed direction.

The present invention has been made in view of the above problems, and aims at providing a cutting insert having excellent chip discharge performance.

Patent Document 1: Japanese Unexamined Patent Publication No. 2008-272923;
Patent Document 2: Japanese Unexamined Patent Publication No. 9-174308; and
Patent Document 3: Japanese Unexamined Patent Publication No. 2001-322010

SUMMARY OF THE INVENTION

A cutting insert according to an embodiment has a body section extending from a rear end side toward a front end side, and a cutting section located closer to the front end side than the body section. The cutting section has an upper surface, a first side surface located close to the front end side, an end cutting edge located along an intersection of the upper surface and the first side surface, a recess located from the end cutting edge toward the body section on the upper surface, and a pair of protrusions located on the upper surface and opposing each other with the recess interposed therebetween. The pair of protrusions has a first protrusion and a second protrusion located on the first protrusion. The first protrusion has a first inclined surface that is inclined upward and approaches another one of the pair of protrusions as going from the front end side toward the rear end side. A periphery of the second protrusion which is close to the front end side has a convex curvilinear shape in a top view.

BRIEF DESCRIPTION OF THE DRAWINGS

FIG. 12 is a partially enlarged external perspective view of a cutting insert according to a modification.

EMBODIMENTS FOR CARRYING OUT THE INVENTION

<Cutting Insert>

Figure 1:
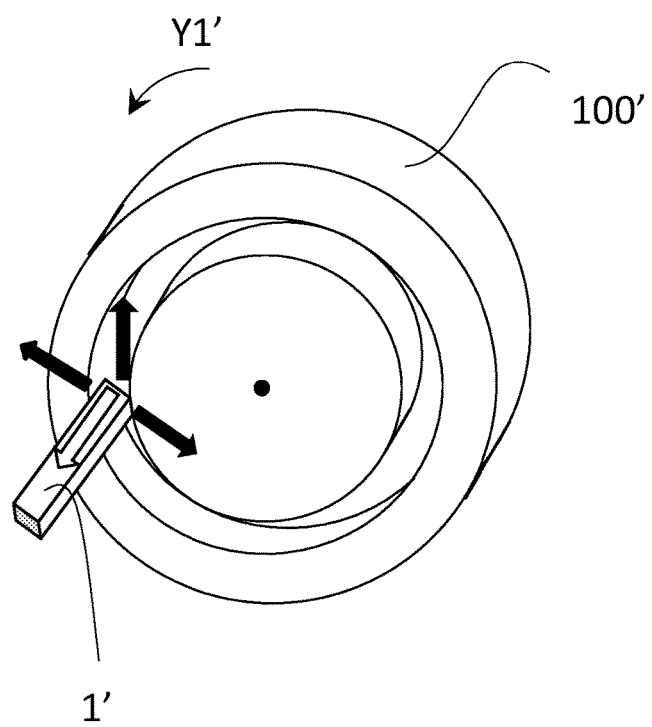
FIG. 1 is a schematic diagram of a grooving process of grooving an end surface of a columnar workpiece.

A cutting insert (also referred to simply as an insert) according to an embodiment of the present invention is described in detail below with reference to FIGS. 1 to 9. The insert of the present invention is applicable to any one of an internal grooving process, an external grooving process, a cutting-off process, and a face grooving process with respect to a workpiece.

For the sake of convenience, the drawings referred to in the following show, in simplified form, only major components among components of the embodiment which are necessary for describing the present invention. Therefore, the insert of the present invention may include any optional component not shown in the drawings referred to in the following. Sizes of the components in the drawings are not faithful to sizes of actual components and to size ratios of the actual components.

Figure 2:
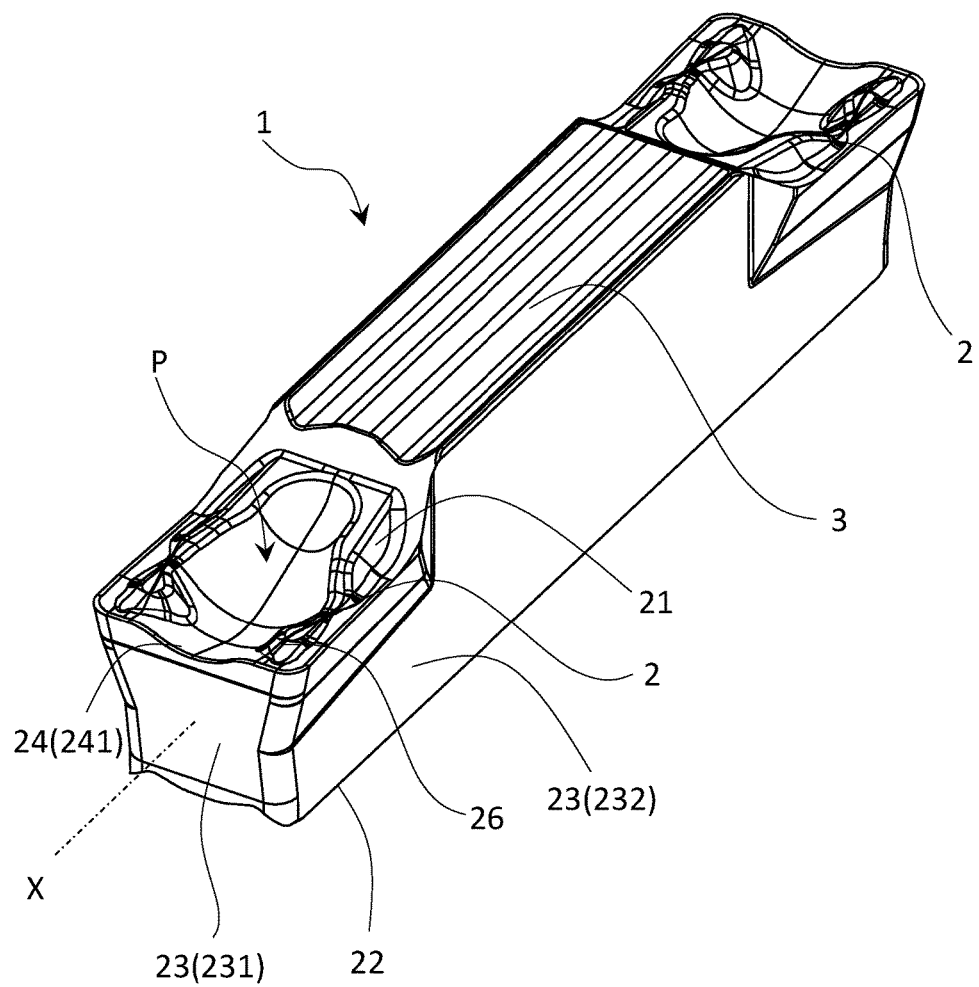
FIG. 2 is an external perspective view of a cutting insert according to an embodiment of the present invention.
Figure 3:
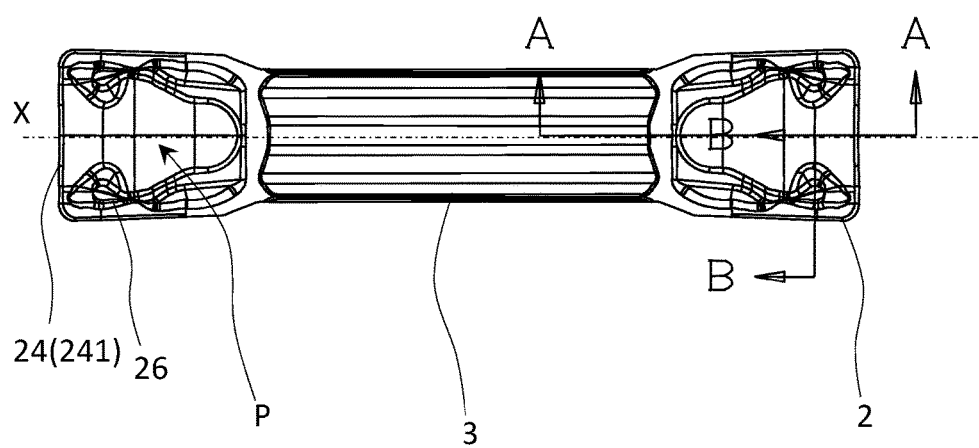
FIG. 3 is a top view of the cutting insert according to the embodiment of the present invention.

As shown in FIG. 2, the insert 1 of the present embodiment has a prism shape, and has two cutting sections 2 and a body section 3. The body section 3 has a clamp surface that extends from a rear end side to a front end side, and is brought into contact with a holder upon fixing to the holder. Here, X denotes a central axis that is drawn from the rear end side of the body section 3 to the front end side thereof.

One of the cutting sections 2 is located closer to the front end side than the body section 3. The other of the cutting sections 2 is located closer to the rear end side than the body section 3. Therefore, the cutting sections 2 are respectively located at both ends of the insert 1, and the body section 3 is located between the cutting sections 2. That is, the two cutting sections 2 are disposed in pairs at both ends of the body section 3.

One of the two cutting sections 2 is used during a cutting process. For example, when using the cutting section 2 located closer to the front end side than the body section 3, the cutting section 2 located closer to the rear end side than the body section 3 is not used. Hence, the insert 1 does not need both of the cutting sections 2, and may have only one of the cutting sections 2.

It is, however, possible to use the cutting section 2 located closer to the rear end side than the body section 3 by inverting the front end side and the rear end side. Therefore, the insert 1 having the two cutting sections 2 enhances economic efficiency.

Hereinafter, when simply called the cutting section 2, this denotes the cutting section 2 of the two cutting sections 2 in the present embodiment which is located closer to the front end side than the body section 3.

For example, cemented carbide or cermet is usable as a material of the insert 1. Examples of a composition of cemented carbide include WC—Co produced by adding cobalt (Co) powder to tungsten carbide (WC), followed by sintering, WC—TiC—Co produced by adding titanium carbide (TiC) to WC—Co, and WC—TiC—TaC—Co produced by adding tantalum carbide (TaC) to WC—TiC—Co. The cermet is a sintered composite material obtained by compositing metal with a ceramic ingredient, and is specifically a titanium compound composed mainly of titanium carbide (TiC) or titanium nitride (TiN).

A surface of the insert 1 may be coated with a film by chemical vapor deposition (CVD) method or physical vapor deposition (PVD) method. Examples of a composition of the film include titanium carbide (TiC), titanium nitride (TiN), titanium carbonitride (TiCN), and alumina ($Al_2O_3$).

As shown in FIG. 2, the cutting section 2 has an upper surface 21, a lower surface 22, and a side surface 23 connected to the upper surface 21 and the lower surface 22. The lower surface 22 functions as a mounting surface, and the side surface 23 functions as a flank surface. The side surface 23 has a first side surface 231 located close to the front end side of the cutting section 2, and a pair of second side surfaces 232 respectively adjacent to the first side surface 231.

The insert 1 has a rectangular shape in a top view, and the upper surface 21 has two long sides and two short sides. A region of the side surface 23 which extends along the two short sides of the upper surface 21 corresponds to the first side surface 231, and a region of the side surface 23 which extends along the two long sides of the upper surface 21 corresponds to the second side surface 232. For example, a longitudinal length of the insert 1 is 18-22 mm, and a length (hereinafter also referred to as a width) orthogonal to a longitudinal direction in the top view (hereinafter also referred to as a width direction) is 2-6 mm. The upper surface 21 is not in a strictly rectangular shape in the top view, and corner portion thereof are respectively formed by a convex curved line.

A length of the cutting section 2 in the width direction decreases as approaching the body section 3 in order to prevent portions of the insert 1 other than a cutting edge from coming into contact with an inner wall surface of a groove formed on a workpiece during the process. A height between the lower surface 22 and the upper surface 21 of the insert 1 is 3.4-6 mm. The longitudinal direction of the insert 1 coincides with an extending direction of the central axis X in the present embodiment.

Figure 7:
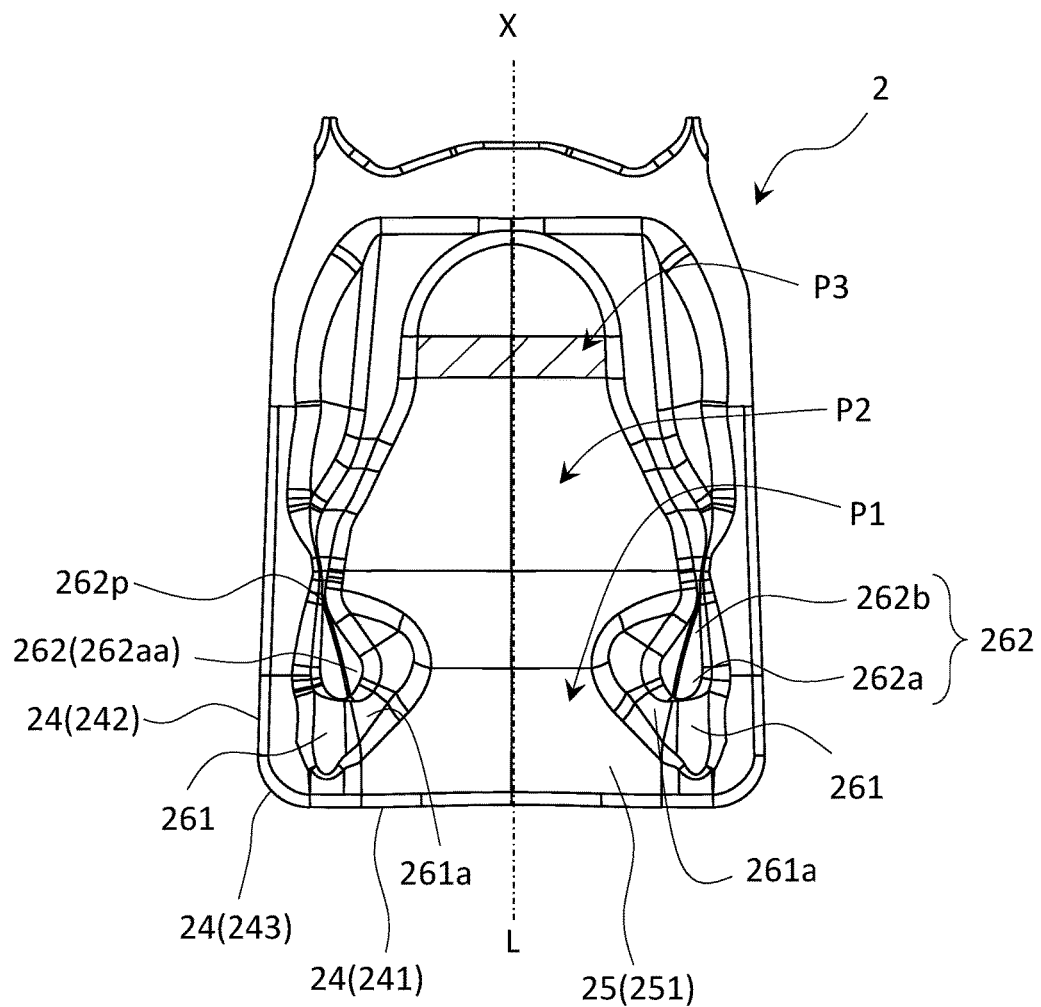
FIG. 7 is a partial top view of the cutting insert shown in FIG. 6.

A cutting edge 24 is disposed along an intersection of the upper surface 21 and the side surface 23. The cutting edge 24 is disposed, for example, along a longitudinal direction and a width direction of the cutting section 2. As shown in FIG. 7, the cutting edge 24 has an end cutting edge 241, a side cutting edge 242, and a corner cutting edge 243. The end cutting edge 241 is disposed along the width direction of the cutting section 2. That is, the end cutting edge 241 is disposed along a ridgeline where the upper surface 21 and the first side surface 231 intersect.

The side cutting edge 242 is disposed along the longitudinal direction of the cutting section 2. That is, the side cutting edge 242 is disposed along a ridgeline where the upper surface 21 and the second side surface 232 intersect. The corner cutting edge 243 is located at the corner portion of the upper surface 21 in between the end cutting edge 241 and the side cutting edge 242, and connects the end cutting edge 241 and the side cutting edge 242. Accordingly, the corner cutting edge 243 has a convex curvilinear shape. The side cutting edge so disposed permits carrying out a traversing process using the side cutting edge 242, such as a process of increasing a width of a groove of a workpiece, and a process of finishing a surface of the groove of the workpiece.

Figure 9:
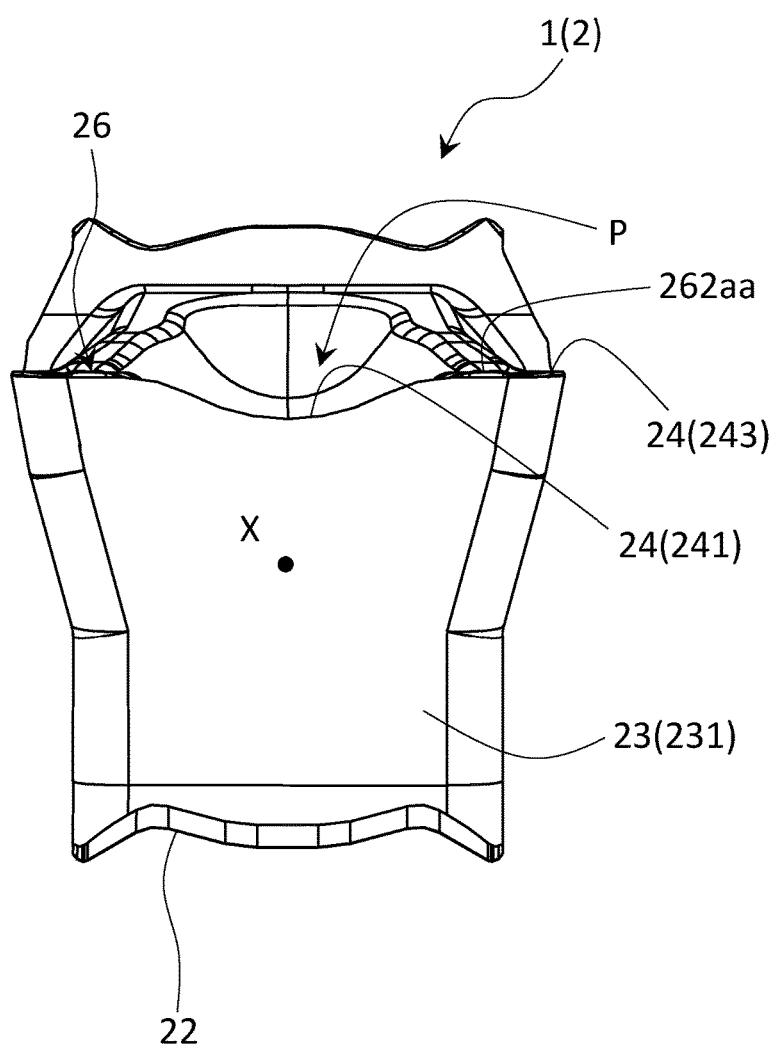
FIG. 9 is a partial side view of the cutting insert shown in FIG. 6.

In order to ensure that a processed surface is not susceptible to damage due to chips deformed in a width direction thereof, a middle part of the end cutting edge 241 has a curved shape that is dented downward in a side view from the first side surface 231 as shown in FIG. 9. The end cutting edge 241 having the part with the curved shape contributes to stably narrowing down chips cut by the end cutting edge 241. Both end portions of the end cutting edge 241 which are connected to the corner cutting edge 243 have a straight line shape as shown in FIG. 9.

The upper surface 21 has a recess P, a rake surface 25, and a pair of protrusions 26. The recess P extends from the end cutting edge 241 along the longitudinal direction of the cutting section 2. The rake surface 25 is located along the cutting edge 24. In other words, the rake surface 25 is disposed along a periphery of the upper surface 21. The rake surface 25 denotes a surface along which chips graze. The pair of protrusions 26 are opposed to each other with the recess P interposed therebetween.

Figure 8:
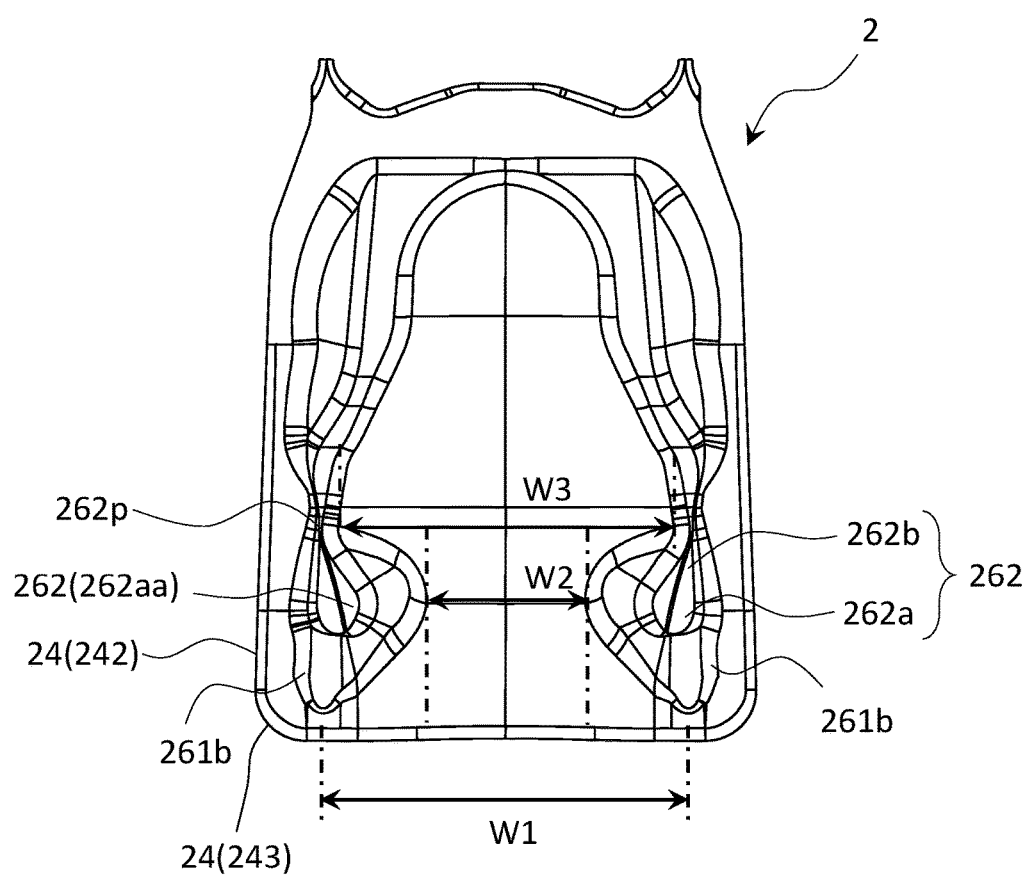
FIG. 8 is a partial top view of the cutting insert shown in FIG. 6, and shows a width of a recess in FIG. 7.

The upper surface 21 has the recess P that extends from the end cutting edge 241 along the longitudinal direction of the cutting section 2. That is, the upper surface 21 has the recess P extending from the end cutting edge 241 toward the body section 3. The recess P measures 4-6 mm in length that extends from the end cutting edge 241 in the longitudinal direction of the cutting section 2. A width of the recess P that is a length in a direction along the end cutting edge 241 in the top view is as follows. As shown in FIG. 8, a width W1 of the recess P at a front end close to the end cutting edge 241 is 2.5-4.5 mm. The recess P has a minimum width W2 of 1-2.4 mm and a maximum width W3 of 2.5-4.3 mm as shown in FIG. 8.

Alternatively, the upper surface 21 may further have a land. The land denotes a narrow band shaped region that is disposed along the cutting edge 24 and has a constant width. The land is disposed to reduce fracture of the cutting edge 24. When the land is disposed on the upper surface 21, the rake surface 25 is located inside the land.

Figure 4:
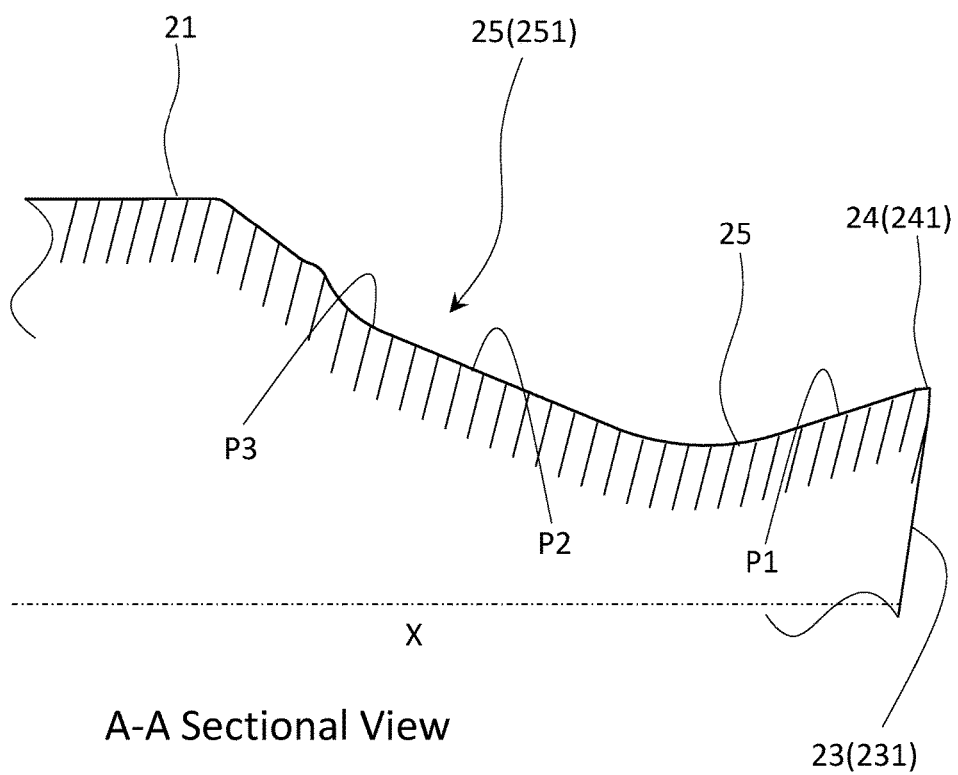
FIG. 4 is a sectional view taken along line A-A in FIG. 3.
Figure 5:
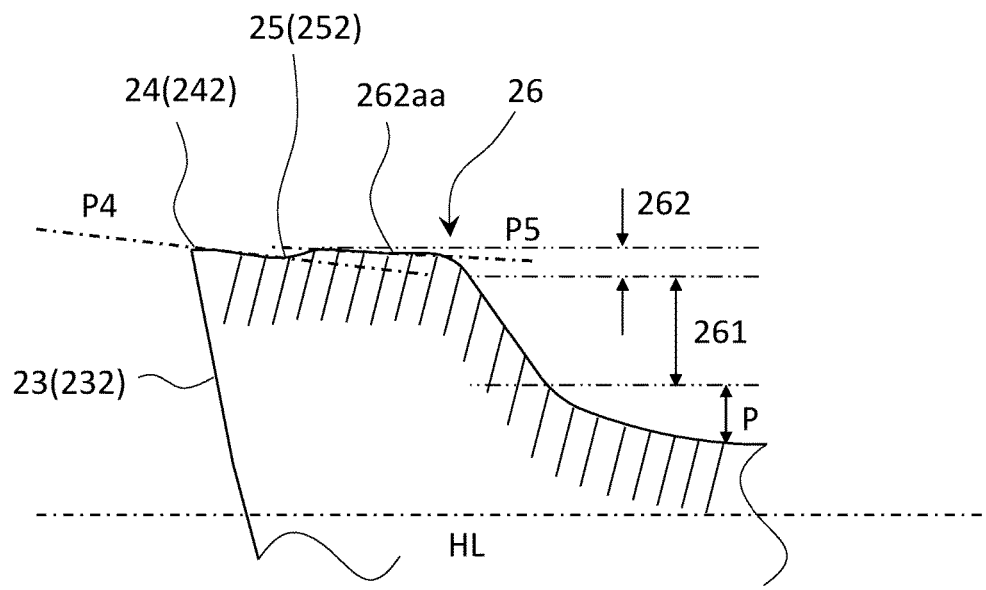
FIG. 5 is a sectional view taken along line B-B in FIG. 3.

The rake surface 25 is disposed inside the cutting edge 24 on the upper surface 21. In the present embodiment, the rake surface being continuous with the end cutting edge 241 is referred to as a first rake surface 251, and the rake surface being continuous with the side cutting edge 242 is referred to as a second rake surface 252 as shown in FIG. 4 or 5. The first rake surface 251 is continuous with the end cutting edge 241 and is dented toward the lower surface 22 as going inward from the end cutting edge 241 as shown in FIG. 4. The second rake surface 252 is continuous with the side cutting edge 242 and is dented toward the lower surface 22 as going inward from the side cutting edge 242.

The upper surface 21 has a region extending from the end cutting edge 241 in the longitudinal direction of the cutting edge 2, and a portion of the region which is located between the pair of protrusions 26 and is dented relative to the periphery of the upper surface 21 corresponds to the recess P. The recess P so disposed makes it easier for the end cutting edge 241 to cut into the workpiece, thereby reducing cutting resistance. Consequently, relative vibration that occurs between the end cutting edge 241 and the workpiece (hereinafter referred to as "chatter vibration") is reducible, thereby improving machining accuracy. The above-mentioned portion corresponds to the recess P, and therefore, a partial region of the recess P which extends along the end cutting edge 241 corresponds to the first rake surface 251.

As shown in FIG. 5, the second rake surface 252 is continuous with the side cutting edge 242, and is inclined downward as going inward from the side cutting edge 242. The pair of protrusions 26 and the recess P are disposed inwardly of the second rake surface 252. A ridgeline of the side cutting edge 242 is located above the second rake surface 252, and the side cutting edge 242 has a so-called positive shape.

The pair of protrusions 26 (26a, 26b) is disposed on the upper surface 21. In the present embodiment, the protrusions 26a and 26b are opposed to each other with a perpendicular line L of the end cutting edge 241 interposed therebetween in the top view. That is, the upper surface 21 has the pair of protrusions 26 (26a, 26b) opposed to each other with the recess P interposed therebetween, and protruding toward the recess P. This configuration makes a cross section of chips deformable into a concave shape. Specifically, the chips are deformable and the cross section of the chips are deformable into the concave shape by a difference in height between a bottom of the recess P and a top of each of the protrusions 26 on the upper surface 21.

In the present embodiment, the perpendicular line L corresponds to a perpendicular bisector of the end cutting edge 241 in the top view. The recess P and the pair of protrusions 26 are respectively arranged in linear symmetry with respect to the perpendicular line L in the top view. Hence, the chips are deformable at their respective central portions into the concave shape. This leads to a satisfactory widthwise balance of the chips, thereby achieving satisfactory chip discharge performance.

Thus, the chips generated by the end cutting edge 241 are deformable into the concave shape, so that the chips become narrower than the width of the end cutting edge 241, namely, the width of the short sides of the cutting section 2. This contributes to reducing a risk that the chips damage a processed surface of the workpiece around the chips. In the process of cutting with the side cutting edge 242, namely, the traversing process, the pair of protrusions 26 plays a role as a breaker, and performs a satisfactory control of a curling diameter of the chips so as to be discharged.

The pair of protrusions 26 includes a first protrusion 261 and a second protrusion 262. The second protrusion 262 is located on the first protrusion 261.

Figure 6:
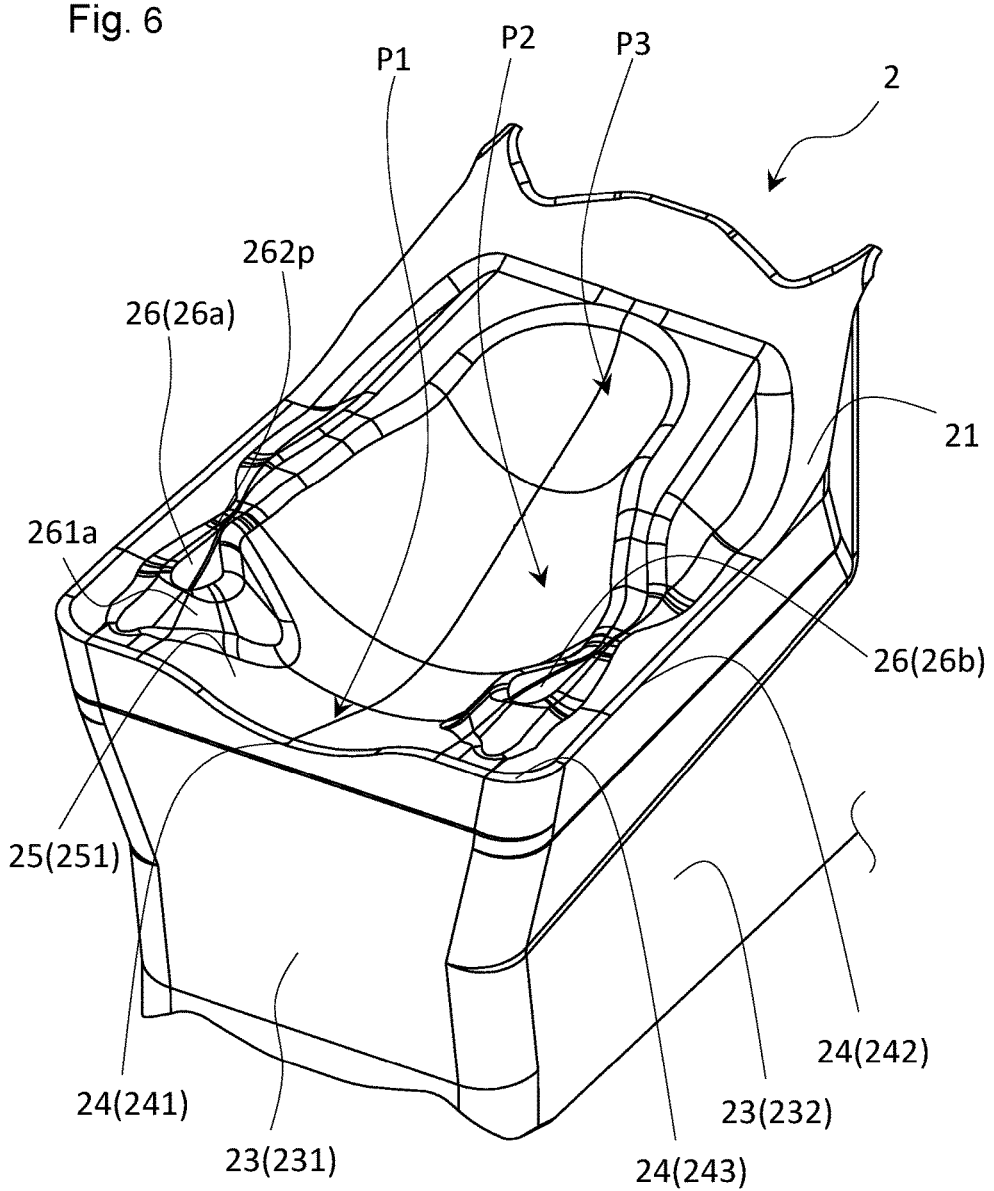
FIG. 6 is a partially enlarged external perspective view of the cutting insert according to the embodiment of the present invention.

As shown in FIGS. 6 and 7, the first protrusion 261 has a first inclined surface 261a. The first inclined surface 261a is located on the opposite side of a surface of the pair of protrusions 26 which is close to the side cutting edge 242. Accordingly, the first inclined surface 261a disposed on one of the pair of protrusions 26 is located opposite the other of the pair of protrusions 26. The first inclined surface 261a has a flat shape in the present embodiment.

The first inclined surface 261a is inclined upward so as to have a larger height as going from the front end side toward the rear end side. Additionally, the first inclined surface 261a located on the one of the pair of protrusions 26 is disposed so as to approach the other of the pair of protrusions 26 as going from the front end side toward the rear end side. Therefore, a pair of the first inclined surfaces 261a respectively disposed on the pair of protrusions 26 is disposed so as to approach each other as going from the front end side toward the rear end side.

Here, the front end side denotes a side of the cutting section 2 which is close to the end cutting edge 241. The rear end side is opposite the front end side, and denotes a side of the cutting section 2 which is close to the body section 3.

A periphery of the second protrusion 262 which is close to the front end side has a convex curvilinear shape in the top view as shown in FIG. 7. Specifically, a surface of the second protrusion 262 which is close to the front end side that is close to the end cutting edge 241 has the convex curvilinear shape because the periphery of the second protrusion 262 which is close to the front end side has the convex curvilinear shape in the present embodiment.

Even when a flow direction of chips cut by the end cutting edge 241 become unstable and the chips flow from a direction inclined with respect to the perpendicular line L toward the pair of protrusions 26, it is possible to stably curve the chips at the part of the second protrusion 262 which has the convex curvilinear shape. Furthermore, the chips curved toward the recess P come into contact with the first inclined surface 261a on the first protrusion 261 disposed under the second protrusion 262.

On this occasion, the chips are stably guided to the recess P owing to the first inclined surface 261a having the foregoing configuration. Additionally, the flow direction of the chips that flow from the front end side toward the rear end side is stably controlled to a direction along the perpendicular line L by the first inclined surface 261a.

Particularly, in the face grooving process, chips whose right end side and left end side have different curling diameters are generated due to the influence of a difference in cutting speed between right and left end sides of the end cutting edge 241, and hence the chips are discharged in a spiral. On this occasion, the chips may be discharged with a rightward or leftward inclination. Even in such a situation, either one of the pair of protrusions 26 is capable of stably supporting the chips.

In addition to the above advantage, it is possible to more largely curve the chips because the pair of inclined surfaces 261a disposed on the pair of protrusions 26 approaches each other as going from the front end side toward the rear end side in the present embodiment. This reduces the possibility that the processed surface of the workpiece is damaged by the chips.

The first protrusion 261 has a second inclined surface 261b in addition to the first inclined surface 261a. The second inclined surface 261b is a surface of the pair of protrusions 26 which is close to the side cutting edge 242, and is located along the side cutting edge 242. The second inclined surface 261b is inclined upward so as to have a larger height as departing from the side cutting edge 242.

In the process of cutting with the side cutting edge 242, the second inclined surface 261b plays a role as a breaker. On this occasion, it is possible to reduce variations in curling diameter of chips to be curled by the second inclined surface 261b owing to the second inclined surface 261b extending along the side cutting edge 242. This ensures stable discharge of the chips.

The second protrusion 262 includes a convex curvilinear shaped part 262a and a triangular shaped part 262b. The convex curvilinear shaped part 262a is located close to the front end side on the second protrusion 262 in the top view. The convex curvilinear shaped part 262a has a convex curvilinear shaped periphery.

Accordingly, the periphery of the second protrusion 262 which is close to the front end side has the convex curvilinear shape in the present embodiment.

The triangular shaped part 262b is located close to the rear end side on the second protrusion 262 in the top view. A corner portion 262p of corner portions of the triangular shaped part 262b protrudes toward the body section 3 located closer to the rear end side than the cutting section 2. Other two corner portions of the triangular shaped part 262b are respectively connected to the convex curvilinear shaped part 262a. A side part of the triangular shaped part 262b which is opposed to the side cutting edge 242 is located along the side cutting edge 242 in the top view.

The second protrusion 262 is made up of the convex curvilinear shaped part 262a and the triangular shaped part 262b. Therefore, the second protrusion 262 has a water drop-like shape in the top view.

The triangular shaped part 262b having the above shape is located closer to the rear end side of the second protrusion 262, and accordingly a distance between a pair of the triangular shaped parts 262 in the pair of second protrusions 262 increases as going from the front end side toward the rear end side. This reduces the possibility that the chips flowing from the front end side toward the rear end side come into contact with the triangular shaped parts 262b. Although a chip flow may be disrupted when the chips excessively come into contact with the second protrusions 262, a smooth chip flow is ensured by the triangular shaped parts 262b of the second protrusions 262.

As shown in FIG. 7, the corner portion 262p of the triangular shaped parts 262b in the protrusions 26 are oriented in an outward separating direction with respect to a virtual straight line along the perpendicular line L that is the perpendicular bisector of the end cutting edge 241 in the top view. That is, surfaces of the pair of triangular shaped parts 262b, which are opposed to each other, are respectively located so as to approach the side cutting edge 242 as going from the front end side toward the rear end side. Accordingly, a widthwise length of the surfaces of the triangular shaped parts 262b opposed to each other increases as going from the front end side toward the rear end side.

Therefore, the recess P is formed so that a region thereof surrounded by the pair of triangular shaped parts 262b has a larger width than a region thereof surrounded by the pair of convex curvilinear shaped parts 262a. That is, the convex curvilinear shaped parts 262a protrude toward the perpendicular line L relative to the triangular shaped parts 262b on the second protrusions 262. The recess P is formed so as to have a maximum width at a portion thereof passing through the corner portion 262p. The portion of the recess P having the maximum width has a maximum width W3 shown in FIG. 8.

As shown in FIG. 6 or 9, the recess P has a first region P1, a second region P2, and a third region P3. The first region P1, the second region P2, and the third region P3 are located from the end cutting edge 241 along the longitudinal direction of the cutting section 2 in the order of the first region P1, the second region P2, and the third region P3.

The first region P1 is located between the pair of protrusions 26. A part of the first region P1 corresponds to the rake surface 25 and has a function of scooping chips. As shown in FIG. 4, the first region P1 is inclined obliquely downwardly toward the bottom of the recess P as departing from the end cutting edge 241, and corresponds to a region of the recess P which extends from the end cutting edge 241 to the bottom of the recess P. An inclination angle of the first region P1 is set to 15-20° at a maximum with respect to a horizontal line HL in a cross-sectional view. FIGS. 4 and 5 show a state in which the insert 1 is disposed on a horizontal plane.

The second region P2 is located closer to the rear end side than the first inclined part P1. The second region P2 is a surface along which chips graze, and has a function of flowing the chips along the longitudinal direction of the cutting section 2. As shown in FIG. 4, the second region P2 is a region which is inclined upward as departing from the end cutting edge 241, and extends from the bottom of the recess P to the rear end side. An inclination angle of the second region P2 is set to 15-40° at a maximum with respect to the horizontal line HL in the cross-sectional view.

As shown in FIG. 7, the second region P2 is also formed so that a width thereof gradually decreases as going from the end cutting edge 241 toward the rear end side in the top view. This makes it possible to gradually collect the chips to a central part of the second region P2, and also control the chip flow.

The third region P3 is disposed continuously with the second region P2. A width of the third region P3 gradually decreases toward the rear end side at a lower degree than that of the second region P2. That is, an angle formed by the central axis X and an outer edge of the third region P3 which is close to the side cutting edge 242 is smaller than an angle formed by the central axis X and an outer edge of the second region P2 which is close to the side cutting edge 242 in the top view.

The width of the third region P3 is constant in the insert 1 of the present embodiment. In FIG. 7, the third region is indicated by oblique hatching. The angle formed by the central axis X and the outer edge of the third region P3 which is close to the side cutting edge 242 is 0°. Therefore, the width of the third region P3 is made smaller than that of the second region P2 in the top view. The second region P3 has the smaller width at a boundary between the second region P2 and the third region P3, thus making it possible to narrow down the chips and cause the chips to flow upward.

The term "constant" does not require that the width of the third region P3 is strictly constant and remains unchanged toward the rear end side. Although the angle formed by the central axis X and the outer edge close to the side cutting edge 242 is preferably 0° as in the present embodiment, the angle may be approximately −5° to 5°.

This causes the chips to flow more upward and thereby improve stability of the chip flow. An inclination angle of the third region P3 is set to 20-45° at a maximum with respect to the horizontal line HL in the cross-sectional view. Setting is made so that a maximum value of the inclination angle of the third region P3 is larger than a maximum value of the inclination angle of the second region P2.

As shown in FIG. 5, the second rake surface 252 is a surface along which chips cut by the side cutting edge 242 graze. A maximum value of an inclination angle of the second rake surface 252 is set to 5-10° at a maximum with respect to the horizontal line HL in the cross-sectional view.

As shown in FIG. 7, the width of the recess P decreases stepwise from the end cutting edge 241 toward the rear end side in the top view. Specifically, the width in the second region P2 decreases as going from the front end side toward the rear end side, and the width in the third region P3 is constant from the front end side to the rear end side in the present embodiment. Thus, the width of the recess P decreases stepwise and thereby controls the chips grazing along the upper surface 21 so as to come together at the center in the width direction of the cutting section 2. This reduces the possibility that the chips are unintentionally discharged with a large deviation in the width direction thereof, thereby reducing the cause of chip clogging.

A flat portion 262aa that is flat is located at the convex curvilinear shaped part 262a of the second protrusion 262. As shown in FIG. 5, a circumference of the flat portion 261aa is inclined downward as departing from the flat portion 262aa. As shown in FIG. 7 or 8, the first protrusion 261 having the triangular shape in the top view is disposed under the second protrusion 262.

Thus, the convex curvilinear shaped part 262a has the flat portion 262aa, and the circumference thereof is inclined. Therefore, the chips cut by the end cutting edge 241 come into contact with the convex curvilinear shaped part 262a with a round shape, and then flow with a moderate change toward the recess P, while avoiding an excessively large height of an upper end of the convex curvilinear shaped part 262a. It is therefore possible to moderately narrow down the chips.

The flat portion 262aa has a larger height as approaching the side cutting edge 242 in a cross section that is orthogonal to the central axis X of the body section 3 as shown in FIG. 5. In other words, the flat portion 262aa is inclined downward as going from a peripheral side of the upper surface 21 toward a center thereof. In FIG. 5, the flat portion 262aa is indicated as a fifth region P5. The chips can be narrowed down further toward the center by disposing the fifth region P5 that is the flat portion 262aa. The fifth region P5 is inclined at 4-6° with respect to the horizontal line HL.

The flat portion 262aa is also located further away from the perpendicular line L as going toward the body section 3 in the top view. This ensures that the surfaces of the pair of triangular shaped parts 262b opposed to each other are respectively located closer to the side cutting edge 242 as going from the front end side toward the rear end side.

The second protrusion 262 has the convex curvilinear shaped part 262a and the flat portion 262aa in the present embodiment. Therefore, as shown in FIG. 5, the flat portion 262aa and a convex curvilinear part located inside the flat portion 262aa (the right side in FIG. 5) correspond to the second protrusion 262. A concave curvilinear shaped part located further inward than the second protrusion 262 corresponds to the recess P. A straight line shaped portion located between the second protrusion 262 and the recess P corresponds to the first protrusion 261.

The second protrusion 262 has a shape formed by combining the convex curvilinear shaped part 262a and the triangular shaped part 262b. The convex curvilinear shaped part 262a is disposed on a side of the second protrusion 262 which is close to the end cutting edge 241, and the corner portion 262p of the triangular shaped part 262b protrudes in a direction away from the end cutting edge 241. That is, it is configured so that no protrusion is disposed on the side of the second protrusion 262 which is close to the end cutting edge 241. This ensures that the chips cut by the end cutting edge 241 have a relatively small number of contacts with the convex curvilinear shaped part 262a.

When chips contact somewhere on the upper surface 21 of the insert 1, the chips are likely to jump up and separate from the upper surface 21. Therefore, the chips may separate from the upper surface 21 and bend toward the end cutting edge 241. There is no support of the chips due to separation of the chips from the upper surface 21, and hence the chip flow becomes unstable. This leads to a risk that the chips are caught between the workpiece and the insert 1, and the chips are apt to be caught in a cutting tool.

With the present embodiment, the second protrusion 262 has the convex curvilinear shaped part 262a, and the periphery of the second protrusion 262 which is close to the end cutting edge 241 has the convex curvilinear shape with the round shape in the top view. Even when the chips come into contact with the protrusion 26, impact exerted on the chips is reducible, making it difficult for the chips to separate from the upper surface 21. It is consequently possible to provide the insert 1 having the excellent chip discharge performance, as well as the cutting tool 10, the cutting tool 10, and a method of manufacturing a machined product.

The insert 1 of the present embodiment ensures the maximum width W3 at the central part of the recess P by locating the corner portion 262p of the triangular shaped part 262b in the direction away from the end cutting edge 241. It is consequently possible to stepwisely narrow down the chips toward the center behind the protrusions 26, thereby stabilizing the chip flow.

Figure 13:
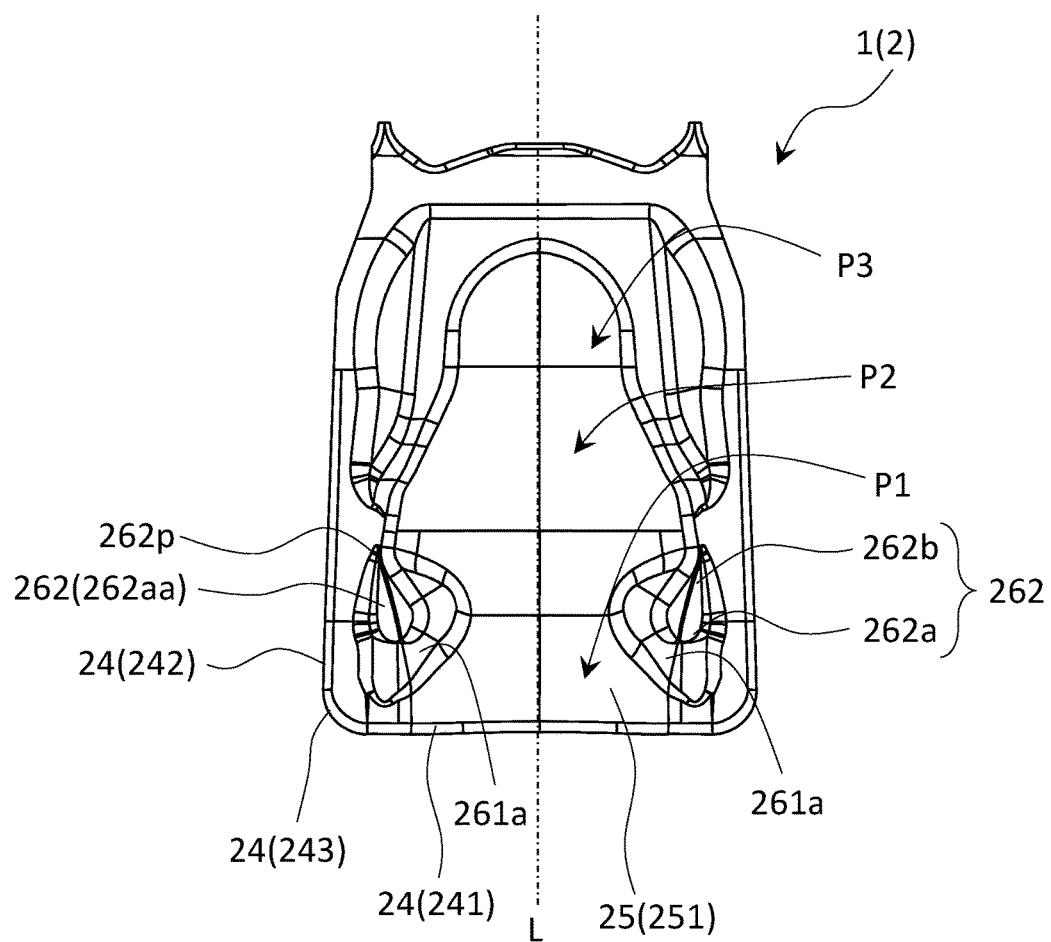
FIG. 13 is a partial top view of the cutting insert shown in FIG. 12.

The present invention is not limited to the foregoing embodiment, and various changes, improvements, or the like may be made therein without departing from the spirit and scope of the present invention. In the foregoing embodiment, as shown in FIG. 6 or 7, another protrusion besides the pair of protrusions 26 is disposed at a position further away from the end cutting edge 241 than the protrusions 26 on the upper surface 21, and the protrusions 26 are connected to the another protrusion. Alternatively, as shown in FIGS. 12 and 13, the pair of protrusions 26 may be disposed away from another protrusion disposed around the pair of protrusions 26 on the upper surface 21.

<Cutting Tool>

The insert 1 is applicable to any one of the internal grooving process, external grooving process, cutting-off process, and face grooving process. The cutting tool 10 with the insert 1 attached thereto is described below with reference to FIG. 10 by exemplifying the case of applying the insert 1 to the face grooving process.

Figure 10:
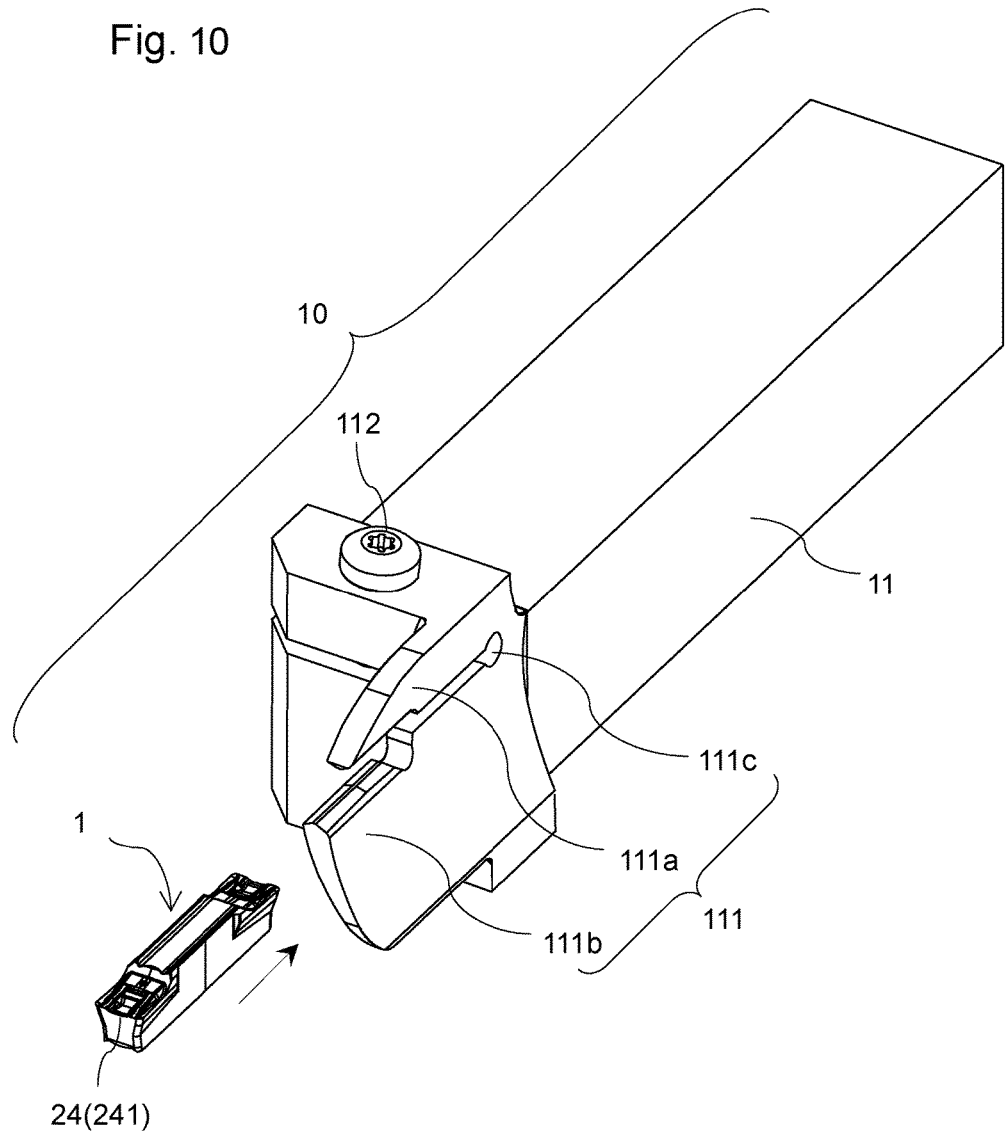
FIG. 10 is an exploded, external perspective view of a cutting tool according to an embodiment of the present invention.
Figure 11A:
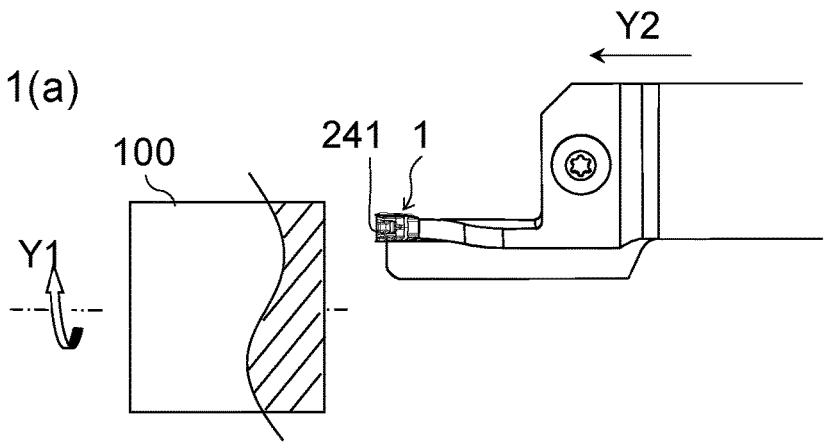
FIGS. 11(a) to 11(d) are diagrams showing a method of manufacturing a machined product according to an embodiment of the present invention.
Figure 11B:
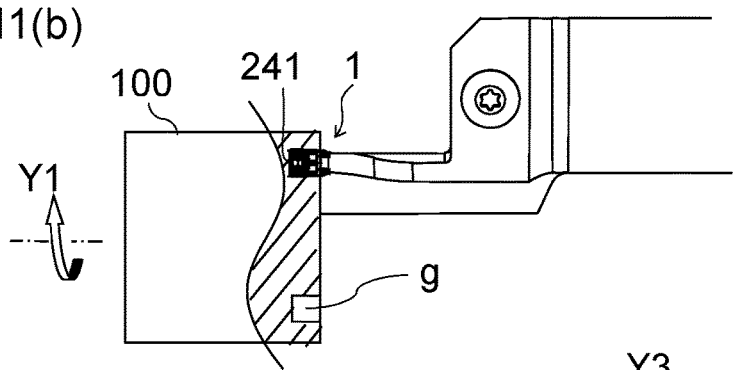
Figure 11C:
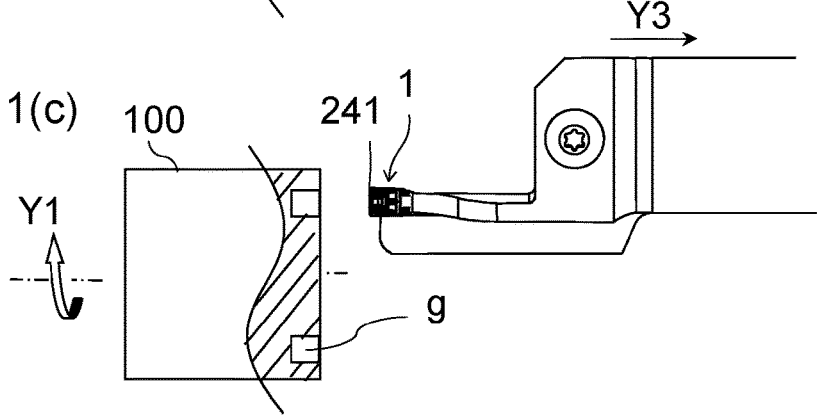
Figure 11D:
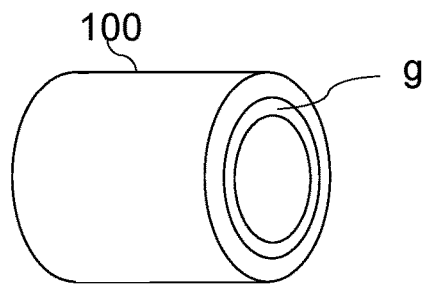

As shown in FIG. 10, the cutting tool 10 of the present embodiment includes the insert 1 and a prismatic holder 11 having a holding part 111 that holds the insert 1 at a front end thereof. The insert 1 is attached to a front end of the holder 11 so that the end cutting edge 241 protrudes from the front end of the holding part 111. Although the holder 11 and the holding part 111 are integrally formed from the viewpoint of improving durability in the present embodiment, the holding part 111 and the holder 11 may be attachable and detachable.

The present embodiment employs a method of clamping the insert 1, which includes controlling clamping force via a screw 112 disposed at the front end of the holder 11, and holding down the insert 1 from above, without limitation thereto.

The insert 1 is fixable to the holder 11, for example, in the following manner. As shown in FIG. 10, firstly, the insert 1 is inserted between an upper jaw part 111*a* and a lower jaw part 111*b* of the holding part 111. Subsequently, the screw 112 is fastened, and the upper jaw part 11*a* is elastically deformed and pushed down.

Consequently, the insert 1 is pressed by the lower jaw part 111*b*, and is held and fixed between the upper jaw part 111*a* and the lower jaw part 111*b*. Further, when a slit 111*c* is already formed, the slit 111*c* further facilitates elastic deformation of the upper jaw part 111*a*, thus making it easier to push down a front end of the upper jaw part 111*b*.

Additionally in the present embodiment, for use in the face grooving process, the lower jaw part 111*b* is curved along an outer periphery and an inner periphery of a processed groove in a front end view as shown in FIG. 10. When the lower jaw part 111*b* is formed vertically in the front end view, the lower jaw part 111*b* may come into contact with the processed groove during the process depending on a size of a drilling diameter because an annular groove is to be formed in the face grooving process. Hence, the drilling diameter is previously determined, and the lower jaw part 111*b* is to be curved along the outer periphery and the inner periphery of the processed groove.

<Method of Cutting Workpiece>

An embodiment of a method of cutting a workpiece, which is carried out using the cutting tool 10 of the present invention, is described below with reference to FIG. 11. The present embodiment is the face grooving process, and therefore, an annular groove g is to be formed on an end surface of the workpiece as shown in FIG. 11(*d*). A part of the workpiece shown in FIGS. 11(*a*) to 11(*c*) is shown in a cross section.

The method of cutting the workpiece to be carried out using the cutting tool 10 includes the following steps:

(1) rotating the workpiece 100 in an arrowed direction Y1 as shown in FIG. 11(*a*);

(2) bringing the cutting tool 10 near the workpiece 100 being rotated by moving the cutting tool 10 in an arrowed direction Y2;

(3) cutting the workpiece 100 by bringing the end cutting edge 241 of the cutting tool 10 into contact with the workpiece 100 being rotated as shown in FIG. 11(*b*); and (4) separating the cutting tool 10 from the workpiece 100 after being cut, by moving the cutting tool 10 in an arrowed direction Y3 as shown in FIG. 11(*c*).

In the step (1), the workpiece 100 and the cutting tool 10 need to approach each other. For example, the workpiece W may be brought near the cutting tool 10. Similarly, in the step (4), the workpiece 100 and the cutting tool 10 need to go away from each other. For example, the workpiece 100 may be separated from the cutting tool 10. In the step (3), a process of forming a groove is carried out, and a traversing process is carried out during the grooving process. When a machining process is continued, it is necessary to repeat the step of bringing the end cutting edge 241 of the cutting tool 10 into contact with different portions of the workpiece 100, while the workpiece 100 is kept rotating.

Representative examples of the material of the workpiece include carbon steel, alloy steel, stainless steel, cast iron, and nonferrous metals.

Although the description has been made using a left-handed holder in the present embodiment, a right-handed holder may be used.

DESCRIPTION OF THE REFERENCE NUMERAL

1 cutting insert (insert)
2 cutting section
21 upper surface
22 lower surface
23 side surface
231 first side surface
232 second side surface
24 cutting edge
241 end cutting edge
242 side cutting edge
243 corner cutting edge
25 rake surface
251 first rake surface
252 second rake surface
26 (26*a*, 26*b*) protrusion
261 first protrusion
261*a* first inclined surface
261*b* second inclined surface
262 second protrusion
262*a* convex curvilinear shaped part
262*aa* flat part
262*b* triangular shaped part
262*p* corner portion
3 body section
10 cutting tool
11 holder
111 holding part
111*a* upper jaw part
111*b* lower jaw part
111*c* slit
112 screw
100 workpiece
P recess
L perpendicular line
HL horizontal line
X central axis

The invention claimed is:

1. A cutting insert, comprising:
a cutting section extending from an end side of the cutting insert; and
a body section connected to the cutting section,
the cutting section comprising:
an upper surface;
a first side surface located close to the front end side;
an end cutting edge located along an intersection of the upper surface and the first side surface;
a recess located from the end cutting edge toward the body section on the upper surface; and
a pair of protrusions located on the upper surface and opposing each other with the recess interposed therebetween,
wherein the pair of protrusions comprises a first protrusion and a second protrusion located on the first protrusion,
wherein the first protrusion comprises a first inclined surface that is inclined upward and approaches another one of the pair of protrusions as going from the front end side toward the rear end side, and wherein a periphery of the second protrusion which is close to the front end side has a convex curvilinear shape in a top view.

2. The cutting insert according to claim 1,
wherein the cutting section further comprises a second side surface adjacent to the first side surface, and a side cutting edge located along an intersection of the upper surface and the second side surface, and
wherein the first protrusion further comprises a second inclined surface that is located along the side cutting edge and is inclined upward as going from the side cutting edge toward another one of the pair of protrusions.

3. The cutting insert according to claim 1, wherein the second protrusion comprises a convex curvilinear shaped part located close to the front end side in a top view, and a triangular shaped part located close to the rear end side and comprising a corner portion protruding toward the body section.

4. The cutting insert according to claim 3,
wherein the cutting section further comprises a second side surface adjacent to the first side surface, and a side cutting edge located along an intersection of the upper surface and the second side surface, and
wherein a side part of the triangular shaped part which is opposed to the side cutting edge is located along the side cutting edge in a top view.

5. The cutting insert according to claim 1, wherein the end cutting edge comprises a curve shaped part dented downward from the first side surface in a side view.

6. The cutting insert according to claim 1, wherein the recess comprises a first region located between the pair of protrusions, a second region located closer to the rear end side than the first region and having a width in a direction orthogonal to a central axis of the body section, the width being decreased as going from the front end side toward the rear end side, and a third region located closer to the rear end side than the second region and being constant in the width in the direction orthogonal to the central axis in a top view.

7. The cutting insert according to claim 1, wherein the second protrusion comprises a flat part that is flat and inclined downward as going from a periphery of the upper surface toward a center thereof in a cross section orthogonal to a central axis of the body section.

8. The cutting insert according to claim 7, wherein the flat part is located further away from the central axis as going to the body section in a top view.

9. A cutting tool, comprising:
a cutting insert according to claim 1; and
a holder configured to attach the cutting insert to a front end of the holder.

10. A method of manufacturing a machined product, comprising:
rotating a workpiece;
bringing the cutting tool according to claim 9 near the workpiece being rotated;
cutting the workpiece by bringing the end cutting edge of the cutting tool into contact with the workpiece; and
separating the cutting tool from the workpiece.

\* \* \* \* \*